June 4, 1963
R. E. PAYNE ETAL
3,092,723
DETECTION, METERING AND/OR ANALYSIS OF RADIOACTIVE PARTICLES
Filed Sept. 24, 1958
3 Sheets-Sheet 1
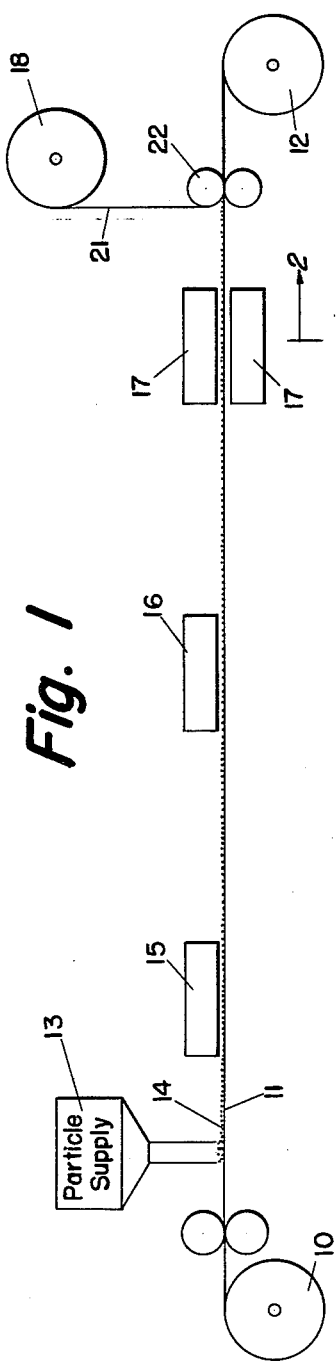
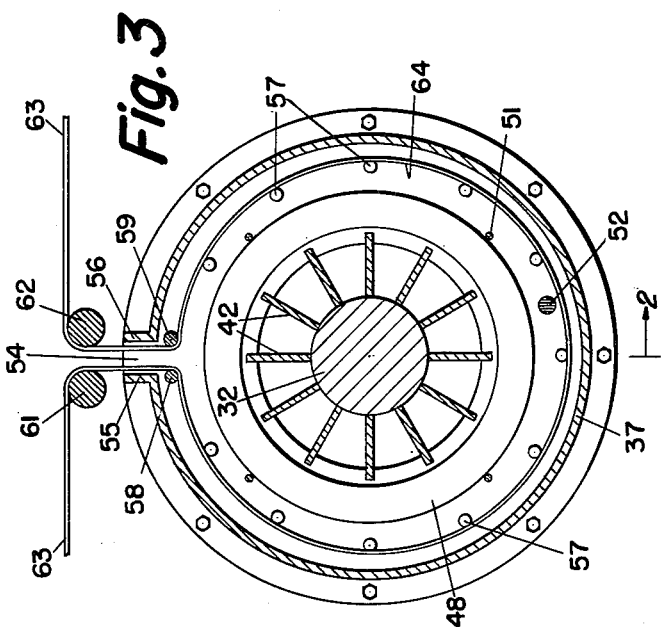
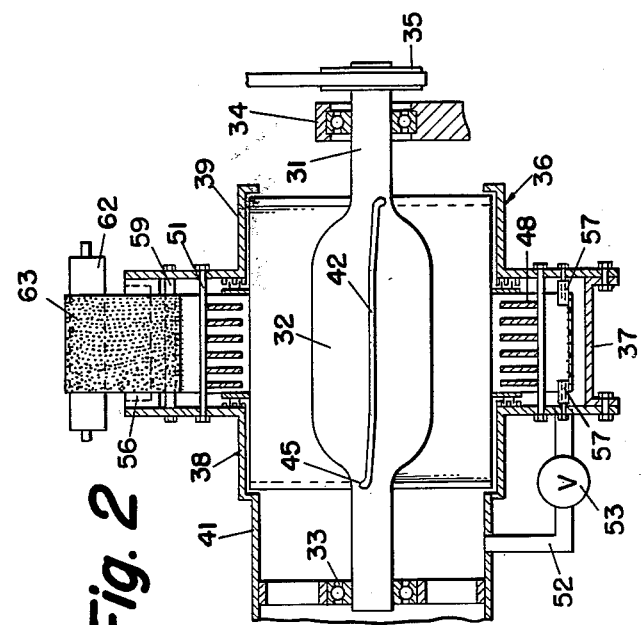
INVENTORS
ROBERT E. PAYNE
MARTIN J. COHEN
HENRY C. GIBSON JR.
BY Hugo G Femman
ATTORNEY

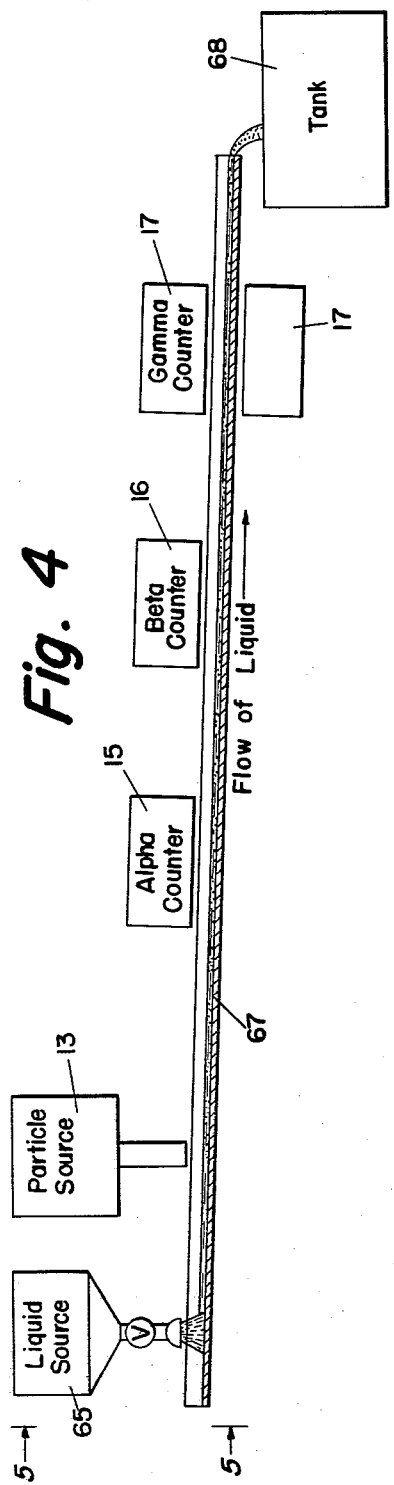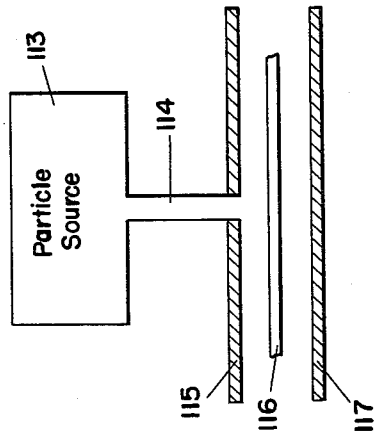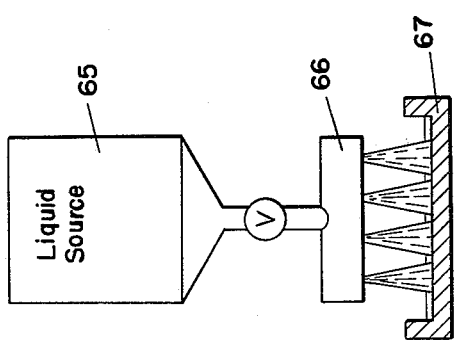

June 4, 1963  R. E. PAYNE ETAL  3,092,723
DETECTION, METERING AND/OR ANALYSIS OF RADIOACTIVE PARTICLES
Filed Sept. 24, 1958  3 Sheets-Sheet 3

INVENTORS
ROBERT E. PAYNE
MARTIN J. COHEN
HENRY C. GIBSON JR.
BY *Hugo G Femman*
ATTORNEY 3,092,723
DETECTION, METERING AND/OR ANALYSIS OF
RADIOACTIVE PARTICLES
Robert E. Payne, Newtown Square, and Martin J. Cohen, King of Prussia, Pa., and Henry C. Gibson, Jr., Palm Beach, Fla., assignors to The Sharples Corporation, a corporation of Delaware
Filed Sept. 24, 1958, Ser. No. 762,966
15 Claims. (Cl. 250—83)

This invention pertains generally to the detection and/or metering or quantitative analysis of radioactive particles, whether of natural or artificial origin or both, and pertains more particularly to the continuous monitoring of gas, such as air, to detect the presence of radioactive particles suspended therein and/or to measure the concentration thereof per unit volume of the gas. The invention also pertains to an analysis of the rays emitted by radioactive particles to determine the relative proportion of alpha, beta, and gamma rays present.

As is well known, alpha rays are comprised of positively-charged particles emitted from a nucleus, each particle being composed of two protons and two neutrons, and identical in all of its measured properties with the nucleus of a helium atom.

Beta rays are comprised of negative electrons and/or positive electrons (positrons) emitted from nuclei undergoing beta-disintegration. The term "electrons" is employed here in its broader sense to include both negatrons and positrons, although the term is more commonly used in a restricted sense to include negatively charged particles only. Positrons are formed in the beta-decay of many radionuclides.

Gamma rays are electromagnetic radiations generally similar to light, ultraviolet rays, X-rays, heat rays, radio waves, and the other electromagnetic radiations. Their wave length is shorter than that of X-rays.

The importance of a continuous and rapid system for the detection and/or metering of radioactive particles suspended in air cannot be overemphasized, whether the air is derived from the atmosphere generally, such as at high or low altitudes, or from an enclosure or environment within which nuclear reactions take place, or otherwise. This is so commonly recognized at present as not to require elaboration.

Sources of airborne particulate radioactivity include nuclear reactor leaks, nuclear bombs, and other loci of radioactivity including both artificial and natural, even though the former, from the standpoint of the safety of mankind, is by far the more important.

Present systems for the detection and metering of airborne radioactivity include the use of filters in which the particulate matter becomes imbedded, and thus is caught in a large volume of foreign material which interferes with efficient measurement of the activity, as is obvious. Moreover, any system based on filtration does not lend itself to the rapid detection and/or metering of radioactivity, and/or chemical or physical analysis of the particulate.

The present invention is based upon the rapid collection and concentration of finely divided solid particles, e.g. particles present in a gas such as air, and the immediate monitoring thereof to determine whether any radioactivity is present.

An outstanding embodiment of the invention involves the deposition, in a thin layer, of finely divided material derived from any source on a moving film of a solid and/or liquid, and the rapid detection and/or metering of any radioactivity present. The solid or liquid, e.g. tape, is preferably comprised of gamma ray radiotransparent material, such as, in the case of a solid, polyethylene, or a polyester type material available in the trade under the Trademark "Mylar," or such as, in the case of a liquid, carbon tetrachloride. As used herein, the terms "gamma ray radiotransparent" defines a material that allows the passage of gamma rays freely.

The invention is also based on a process and apparatus for the deposition, in a thin layer, of particles from any source, e.g. air, on a moving film of solid and/or liquid, preferably of gamma ray radiotransparent material, and the rapid radioactive analysis of such particles to determine whether any radioactivity is present, and/or how it is distributed between different types of radioactivity and/or particle sizes.

The invention is particularly adapted to use in combination with means for the centrifugal separation from a gas, e.g. air, of solid particles to be analyzed for radioactivity. Such means preferably includes the application of both centrifugal force and the force of coriolis, such as is embodied in the apparatus described and claimed in copending application Serial No. 754,334, filed August 11, 1958, by Payne and Gooch, which apparatus is capable of separating from a gas extremely finely divided particles down to and including particles of sub-microscopic size, a very important feature in light of the fact that radioactive particles resulting from nuclear reactions have a wide variety of sizes down to and including particles having dimensions comparable to those of viri.

The invention also includes an improved method and means for the deposition in a thin layer on a moving film of particles separated by centrifugal force, preferably with improved application of coriolis effect, from a gas, such as air.

Further features of the invention will become apparent to persons skilled in the art as the description thereof proceeds and upon reference to the drawings in which:

FIGURE 1 is a flow diagram illustrating an embodiment of the invention;

FIGURE 2 is an elevation, largely in section, of a dust separator having the invention adapted thereto;

FIGURE 3 is a section on line 3—3 of FIGURE 2;

FIGURE 4 is a flow diagram illustrating another embodiment of the invention;

FIGURE 5 is a view taken on line 5—5 of FIGURE 4;

Figure 7:
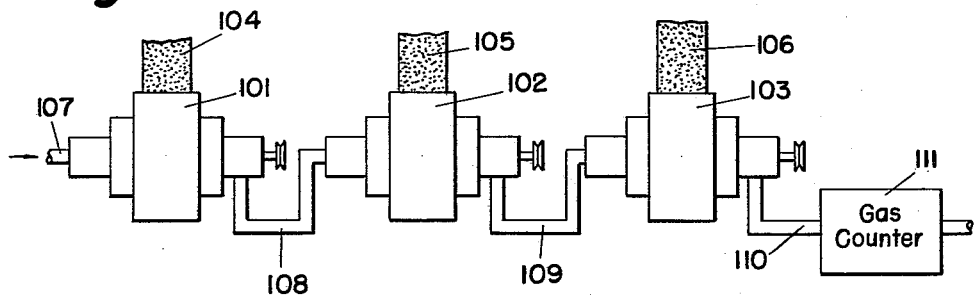

FIGURE 7 diagrammatically illustrates another embodiment of the invention; and

FIGURE 8 diagrammatically illustrates means for assisting in the deposition of particles on a film.

Referring now more particularly to FIGURE 1, at 10 is shown a reel for the feed of tape 11 through the apparatus illustrated, which is shown diagrammatically for convenience in description. Tape 11, after passing through the apparatus is collected on reel 12.

At 13 is shown a source of particles to be examined as to radioactivity. This source is preferably continuous, such as a centrifugal separator for particle laden gas, e.g. air, as already indicated, the particles being deposited on tape 11 as generally indicated at 14, the exact method of deposit, broadly speaking, being immaterial, although a highly preferred method and apparatus will be hereinafter described.

Tape 11 preferably is of a gamma ray radiotransparent material such as polystyrene, polyethylene, or a polyester, the material sold under the Trademark "Mylar" being an example of products available for the purpose. An adhesive coating on the surface of tape 11 to hold the particles in place is not required, for the finely divided character of the particles apparently is sufficient to maintain them in place. Tackiness, preferably slight, however, may be imparted to the surface of tape 11 on which the particles are deposited, if desired for any reason, such as by the application of an adhesive to the tape, e.g. as in the case of a pressure sensitive tape, or by softening the surface with a solvent, or imparting adhesiveness in any other manner. Examples of suitable adhesives are gelatin, soft waxes, etc., and examples of suitable solvents are toluene, methyl ethyl ketone, etc. Ordinary photographic film, preferably unsensitized, can also be used for this purpose.

The deposition of the particles by particle source 13 is preferably continuous and uniform, and tape 11 is preferably unwound from reel 10 and wound up on reel 12 at constant speed, and at a rate such that the coating of particles 14 thereon remains thin, e.g. less than twice the size of the largest particles, or in the case of very small particles, less than 0.01". This is to reduce or eliminate self-absorption and background activity.

Tape 11, after being coated with the particles, is brought into ray detection relationship with one or more ray counters or similar detection equipment, various varieties of which are well known, and do not require detailed description. For example, a counter tube or counting chamber for the detection of alpha particles often operates in the non-multiplying (ionization chamber) or proportional region with pulse height selection to discriminate against pulses due to beta rays or gamma rays, and to pass only those due to alpha particles, the system for counting alpha particles usually including not only the alpha counter tube, but also an amplifier, pulse height discriminator, scaler and recorder, or the alpha counter tube plus the necessary auxiliary circuits for counting alpha particles.

Means for counting beta rays are likewise well-known. A convenient method is to employ an alpha counter with pulse height selection arranged to discriminate against pulses due to both beta rays and gamma rays, as already described, in combination with an alpha counter arranged to discriminate against pulses due to gamma rays only of the three types of rays. From the difference in readings, the beta ray count may be calculated.

The counting of gamma rays apart from both alpha rays and beta rays presents no particular difficulty in view of the fact that these rays are electromagnetic in character, and various devices for the purpose are available in the trade.

Thus the alpha, beta and gamma rays may be detected or counted individually, or in combination, if desired, by any suitable arrangement of the ray detection or counting system, although an outstanding feature of the invention is the provision for the continuous, continual or intermittent rapid counting of the individual rays, in the absence of foreign matter resulting from particle collection equipment, such as filter paper.

There is, therefore, illustrated in FIGURE 1 alpha counter 15 adjusted to discriminate against both beta and gamma rays; beta counter 16 adjusted to discriminate against gamma rays; and gamma ray counter 17 which, in view of its construction discriminates against alpha and beta rays.

Thus $2\pi$ counting is obtained for both alpha and beta rays, and, in view of the use of gamma ray radiotransparent tape, $4\pi$ counting is made available for gamma rays.

It is to be understood, however, that in its broadest aspects, the invention includes the use of tape which is gamma ray radiotranslucent or gamma ray radiopaque, which in the latter case will result in $2\pi$ counting only.

The invention also provides for the storage of the tape, if desired, e.g. for later checking of gamma ray readings, and for this purpose reel 18 is provided holding tape 21, which preferably is of gamma ray radiotransparent material to provide for $4\pi$ counting in the event that tape 11 is also of gamma ray radiotransparent material.

Tape 21 passes over roller 22 and thus is fed onto tape 11, both tape 21 and tape 11 being wound up on reel 12 without exposure of the particles on tape 11, for such particles are thus sealed between tapes 11 and 21. The use of an adhesive to hold tapes 11 and 21 together is unnecessary, but may be employed, if desired, e.g. between the edges thereof, or between their entire surfaces.

If tape 11 is radiotransparent, tape 21 may be radiopaque, whereupon $2\pi$ gamma ray counting only will be available for a rerun, or if tape 11 is a radiopaque, then tape 21 should of course be radiotransparent to provide for $2\pi$ counting upon a rerun.

A centrifuge adapted to provide an improved method and means for the deposition in a thin layer on moving tape of particles centrifugally separated is illustrated in FIGURES 2 and 3, said centrifuge, apart from said improved method and means, being described and claimed in the above-mentioned copending application of Payne and Gooch.

Referring now more particularly to FIGURES 2 and 3, at 31 is shown a shaft having an enlarged portion 32. Shaft 31 is journaled in bearings 33 and 34, and is provided with pulley 35 for driving purposes. Rotation of shaft 31 is counterclockwise when viewed from the left as seen in FIGURE 2.

Surrounding shaft 31 and spaced therefrom is housing 36 having a central enlarged portion 37, and ends of reduced diameter 38 and 39. Gas inlet conduit 41 is connected to inlet end 38 of housing 36.

Affixed to shaft 31 and extending through housing 36, from inlet end 38 to outlet end 39, are a plurality of circumferentially spaced radial vanes 42 positioned in a manner to act as gas impeller elements to cause the flow of gas through housing 36 from left to right as seen in FIGURE 2, as well as to impart a whirling motion thereto.

Positioned within enlarged portion 37 of housing 36 are a plurality of spaced annuli 48, supported as by rods 51.

Gas recycle conduit 52 provided with valve 53 leads from the inner periphery of housing portion 37 to inlet 41.

Housing 36 is provided with a longitudinal opening 54 more clearly seen in FIGURE 3 which is formed by spaced longitudinal flanges 55 and 56 on housing 36.

Circumferentially spaced within and at opposite ends of housing portion 37 radially outwardly of annuli 48 are a plurality of rollers 57 arranged axially in pairs, i.e. with each roller 57 on one end of housing portion 37 axially in line with a roller 57 on the other end.

Positioned within housing portion 37 opposite opening 54 are full width rollers 58 and 59.

Positioned opposite longitudinal opening 54 exteriorly of housing portion 37 are full width rollers 61 and 62.

Tape 63 is shown threading its way inwardly into housing portion 37, first over roller 61, then over roller 58, then over axially-spaced rollers 57, and finally out of housing portion 37 over rollers 59 and 62, the opposite edges only of tape 63 being engaged by said rollers 57.

In operation gas laden with finely divided solid particles, e.g. air, enters through inlet conduit 41, and is brought up to speed by vanes 42. Separation of finely divided particles takes place, the particles being thrown outwardly against inner surface 64 of tape 63 on which the particles collect and are removed from housing portion 37 by the continuously moving tape 63 to which they adhere. The detection of radioactive particles then proceeds the same as described in connection with tape 11 of FIGURE 1, the centrifuge of FIGURES 2 and 3 taking the place of particle source 13 of FIGURE 1.

The gas, freed from particles, leaves housing 36 through outlet end 39.

The deposition of particles for radioactive analysis onto a flowing film of liquid in which the particles are insoluble, partially soluble, selectively soluble, or completely soluble is illustrated in FIGURES 4 and 5, in which 65 indicates a source of liquid, 66 a liquid feeder and distributor for liquid to form a film thereof, 67 a trough for the flow of the film of liquid deposited therein by members 65 and 66, and 68 a tank for the collection of the liquid, after the deposition thereon of particles from source 13, and analysis at stations 15, 16 and 17, the same or similar to that described in connection with FIGURE 1, similar considerations applying as to individual and combinations of alpha, beta and/or gamma ray counting.

A liquid in which radioactive particles, generally speaking, are insoluble is water. A liquid in which radioactive particles are partially soluble selectively is carbon tetrachloride, and a liquid in which radioactive particles, generally speaking, are more or less completely soluble is acetone.

There is thus provided wide versatility and flexibility in the selective counting of radioactivity, the counting proceeding much the same as in the case of FIGURE 1 when the radioactive particles are completely insoluble in the liquid, and modified as to those particles which become the solute when dissolved, in the case of partial and/or selective solubility or complete solubility in the liquid.

Dissolved particles may be recovered for dry analysis upon vaporization of the solvent.

If both the liquid film and trough 67 are radiotransparent, $4\pi$ counting is made available for gamma rays. In any event the liquid is preferably radiotransparent irrespective of the rays to be counted.

It will be understood that particles of such fine subdivision as to remain suspended or to settle slowly in air will remain suspended and/or will settle at a greatly reduced rate in a liquid, the latter being of very much higher density, thus making the deposit thereof on a flowing film of liquid for analysis feasible.

Figure 6:
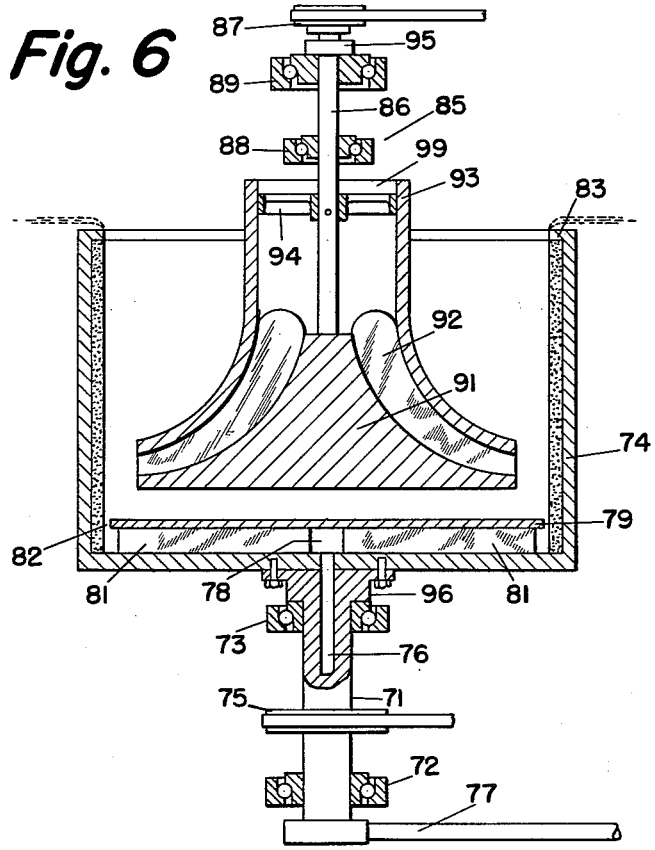
FIGURE 6 is a sectional elevation illustrating a further embodiment of the invention.

Another combination of means for particle separation and of means for particle collection on a flowing film of liquid is illustrated in FIGURE 6 in which 71 is a spindle mounted for rotation in bearings 72 and 73, and 74 is a bowl mounted on spindle 71. Spindle 71 and bowl 74 may be rotated by any suitable means, such as through pulley 75 connected to a source of power, not shown.

Liquid feed channel 76 in spindle 71 is connected to stationary liquid feed conduit 77 which in turn is connected to a source of liquid, not shown. Any of the well-known types of liquid seals employed in the centrifuge art for connecting stationary feed parts to rotating hollow feed spindles may be employed, if desired, in connecting conduit 77 to spindle 71 to prevent leakage.

Feed channel 76 leads into chamber 78 formed in bowl 74 by plate 79 which is spaced from the bottom of bowl 74 by any suitable means, such as the circumferentially spaced vane arrangement indicated at 81, such vanes being attached to bowl 74 and plate 79 by any desired means, e.g. welding. The outer periphery of plate 79 is spaced from the inner periphery of bowl 74 to form a narrow annular aperture or path adjacent the inner periphery of bowl 74 as shown at 82.

The open end of bowl 74 is provided with an inwardly turned edge 83 which serves as a dam for purposes to be hereinafter more particularly described.

Positioned within bowl 74 in operative association therewith is a device 85 for the separation of finely divided solid particles from a gas such as air. Separator 85 as shown, is of a type more particularly described and claimed in the above-mentioned copending application, and is comprised of shaft 86 mounted for rotation, as by pulley 87, in bearings 88 and 89, a rotor 91 provided with circumferentially spaced vanes 92, and a housing 93 mounted on shaft 86 by means of spider 94. Collar 95 secured to shaft 86 rests on the inner race of bearing 89. Likewise shoulder 96 on spindle 71 rests on the inner race of bearing 73.

Bearings 72, 73, 88 and 89 may be supported in any desired manner, such as in a unitary framework, not shown.

In operation liquid fed through conduit 77 passes through channel 76 into chamber 78 wherein it is thrown outwardly by centrifugal force, circumferentially spaced radial vanes indicated at 81 assisting in this connection.

The liquid forms a thin film on the inner periphery of bowl 74, its depth being controlled by the radial dimension of dam 83, which may be made interchangeable for adjustment in such depth. As liquid is fed through channel 76 it passes upwardly through bowl 74 and escapes over dam 83, the film of liquid indicated at 98 being thus brought into continuous flow through bowl 74.

Gas, e.g. air from which particles are to be separated enters housing 93 through opening 99 due to the action of vanes 92 on impeller 91. Particles are separated from the gas by the rotation of impeller 91, and slide down vanes 92 and the interior of housing 93, and are projected outwardly onto liquid film 98 by which they are carried from bowl 74. The particle carrying liquid escapes over dam 83, and is collected in a conventional manner, e.g. by means of the well-known centrifuge cover, not shown. The liquid may then be processed in any desired manner, e.g. immediately or after storage, such as by passing it through a trough 67 with accompanying ray counters as described in connection with FIGURES 4 and 5.

The air from which the particles are thus separated escapes through the open end of bowl 74 radially inwardly of dam 83.

While bowl 74 may be rotated at any desired speed, it usually is preferred to have the speed of rotation relatively low, e.g. not much above that required to deliver the liquid satisfactorily radially outwardly beyond bowl 74 for collection purposes, such as between 100 and 500 revolutions per minute. Rotor 91 and accompanying rotating mechanism, on the other hand, are preferably rotated at relatively high speed in order to increase the centrifugal separating action. Usually for any given design this is limited only by the strength of the materials of which the parts are made which preferably are of high tensile strength metals such as the alloy steels having such properties.

The embodiment of the invention illustrated in FIGURE 7 provides for the classification and collection on moving films of particles as to size, and for convenience in description is shown as comprised of three centrifugal particle separators 101, 102 and 103 connected in series as to gas flow, each centrifugal separator being equipped with a moving film illustrated at 104, 105 and 106, respectively. The centrifugal particle separators of FIGURE 7 may take the form of that described in FIGURES 2 and 3.

The particle laden gas enters unit 101 at 107 and is subjected to sufficient centrifugal force to deposit the larger particles suspended in the gas, the remaining particles passing onto unit 102 together with the gas through conduit 108.

In unit 102 the next larger particles are separated from the gas by the application of greater centrifugal force than that applied in unit 101, the smaller particles passing onto unit 103 together with the gas through conduit 109.

A still higher centrfugal force is applied in unit 103 to separate the smallest particles, the gas leaving unit 103 through conduit 110.

Conduit 110 is illustrated as discharging through gas counter 111 which may be employed either to make certain that all radioactive particles have been removed from the gas, or as a final counting step. It will be understood, of course, that a gas counter may be installed in conduit 108 and/or conduit 109, if desired.

The particles separated in unit 101 are collected on film 104, and may be countered in any desired manner, such as that already described in connection with FIGURES 1 to 3. Likewise, the particles separated in unit 102 are collected on tape 105, and the particles separated in unit 103 are colleced on tape 106, and the particles on the respective tapes may be counted in any desired manner, e.g. as already particularly described.

Any desired means may be employed for assisting in the deposition of finely divided particles on a moving film. For example, in FIGURE 8 a particle source is illustrated at 113 having an outlet 114 which passes through plate 115 disposed on one side of tape 116, on the other side of which is positioned plate 117. By maintaining plate 115 at a higher temperature than plate 117, such as by heating plate 115 electrically, particles are caused to migrate toward tape 116 thus assisting their deposit thereon. Plates 115 and 117 are preferably arranged much closer to tape 116 than illustrated in FIGURE 8 for improved effect.

The invention lends itself to use with the various counters and counter systems known in the art of which there are several varieties designed for the counting of different rays, or combinations thereof. The best known counter is perhaps the Geiger counter which is a radiation counter having a point or small sphere as its central electrode, although its usage has become more or less obsolescent in light of subsequent improvements. Another counter is the cylindrical counter which comprises a cylinder acting as one electrode and a fine wire coaxial with the cylinder acting as the other electrode. The cylinder is usually the cathode and the wire the anode. Still another counter is the parallel plate counter which is comprised of a counter chamber with plane parallel electrodes. A crystal counter utilizes one of several known crystals which are rendered momentarily conducting by ionizing events. A scintillation counter is a device comprised of any of several transparent phosphors together with a photo multiplier tube which detects ionizing particles or radiation by means of the light flash emitted when the radiation is absorbed in the phosphors. Commonly used phosphors are zinc sulfide, calcium tungstate, stilbene, anthracene, naphthalene or thallium-activated sodium iodide. A gas-filled counter is comprised of a gas tube which is used for the detection of radiation by means of gas ionization. A boron counter is a counter in which the sample in the form of a gas is introduced into the counter tube. A boron counter is a counter filled with boron trifluoride gas and/or one having electrodes coated with boron or boron compounds.

The particle bearing film may pass adjacent to a counter, or within or through a counter, or otherwise, depending upon counter design, as will be evident upon becoming familiar with the invention. A convenient method of employing a gas filled counter is to have the tape pass therethrough while maintaining the gas in the counter somewhat above atmospheric pressure, whereupon the slight positive leak outwardly assists in excluding air. Such counters are frequently employed in the proportional region for the detection of weak beta particles. Counters are preferably arranged as closely with respect to the particle collecting device and with respect to each other as is practicable under the particular circumstances to minimize time lag between collection and counting.

Another embodiment of the invention comprises placing a centrifugal particle separating device, e.g. the device 85 of FIGURE 6, within a counter itself, radioactive particles being monitored or detected upon being delivered by the centrifugal separating device in separated condition from the air, or in concentrated condition in the air. For example, a scintillation counter for the immediate detection of gamma radiation may be placed about the device 85 much in the same position as the cylindrical walls of rotor 74, e.g. device 85 may be placed within a stationary cylindrical crystal. Then too, a cylindrical counter may be disposed in the centrifugal particle separating device of FIGURES 2 and 3 in the position occupied therein by the tape 63. Other suitable arrangements of counters with respect to centrifugal particle separating devices will occur to persons skilled in the art upon becoming familiar herewith.

Still another embodiment of the invention comprises concentrating the finely divided solid particles in a gaseous medium, e.g. air, and flowing the concentrated mixture through a radiotransparent conduit arranged in operative association with one or more counters for radioactivity. As an example, tape 63 may be eliminated from FIGURES 2 and 3, and replaced by a tube, e.g. of rectangular cross section, of radiotransparent material, e.g. of the type described above, said tube fitting closely about the flanges 55 and 56. By spacing the flanges 55 and 56 apart somewhat greater than contemplated in the case of film 63, which spacing in the latter case preferably is only sufficient to prevent rubbing of the surface of the ingoing portion with the surface of the outgoing portion, any desired amount of gas, e.g. air, will escape with the separated particles concentrated therein into the tube, and will flow therethrough with said particles. The tube then is brought into operative association with one or more counters, e.g. similar to tape 11 in FIGURE 1. Such arrangement is particularly useful in the case of gamma ray counting.

An outstanding advantage of the invention resides in the manifold increase in sensitivity afforded when compared to conventional filter paper techniques, sensitivity being defined as the time required to detect a threshold amount of radioactivity. By the use of the invention the time required for detection is reduced from the hours or even days sometimes consumed when employing filter paper devices, to minutes or even seconds. Moreover, a centrifugal separating device affords the advantages of processing relatively large volumes of air, of separating and collecting samples of high purity unmixed with filter paper or the like, and of classification as to particle size when desired. Such advantages far overshadow the use of conventional counting devices carrying intermittent planchets or taped samples through or adjacent to counters, as will be obvious.

For convenience in the claims, the term "concentration", or its equivalent, is used generically to include not only separation of the solid particles from the gaseous medium, but also the concentration of said particles in said medium.

Also for conveniece in the claims, the term "monitoring," or its equivalent, is used generically to include all manner of effect produced by or resulting from radioactivity present on or in the particles, whether by way of detection, metering, qualitative and/or quantitative analysis, or otherwise.

Having particularly described the invention, it is to be understood that this is by way of illustration, and that changes, omissions, additions, substitutions, and/or other modifications may be made without departing from the spirit thereof. Accordingly it is intended that the patent shall cover, by suitable expression in the claims, the various features of patentable novelty that reside in the invention.

We claim:

1. A process comprising rapidly concentrating in a locus of centrifugal force finely divided solid particles contained in a fluid medium, said concentration being effected apart from contamination of said particles with extraneous material during said concentration, and monitoring particles so concentrated for radioactivity.

2. The process of claim 1 wherein the concentrated particles are immediately monitored.

3. A process comprising separating finely divided solid particles from a fluid medium in a locus of centrifugal force, depositing the separated particles on a moving nongaseous film, and thereafter bringing said moving film into operative association with at least one counter of radioactivity for monitoring said particles.

4. The process of claim 3 in which the fluid is atmospheric air.

5. The process of claim 4 in which the film is of tape.

6. The process of claim 4 in which the film is of liquid.

7. The process of claim 4 in which the film is radiotransparent, and one counter is a gamma ray counter.

8. The process of claim 3 in which said particles are separately monitored for the presence of alpha rays, beta rays and gamma rays.

9. A process comprising separating finely divided solid particles from a gaseous medium in a locus of centrifugal force, depositing said separated particles on a moving film of liquid, and thereafter monitoring said particles for radioactivity.

10. The process of claim 9 in which the moving film of liquid is brought into operative association with at least one counter of radioactivity for monitoring the particles deposited thereon.

11. The process of claim 9 in which the particles are separated from the liquid prior to monitoring.

12. A process comprising concentrating in a locus of centrifugal force finely divided solid particles in a gaseous medium, and thereafter bringing said gaseous medium into association with at least one counter of radioactivity for monitoring said particles.

13. A process comprising separating finely divided solid particles from a fluid medium successively in a plurality of loci of centrifugal force, each succeeding locus being of greater centrifugal force than the preceding locus, depositing particles from each locus on a separate non-gaseous film, and monitoring the particles on each film for radioactivity.

14. In combination, a centrifugal separator for separating finely divided solid particles from a gaseous medium, said separator having a rotor and a stationary casing surrounding said rotor, of a tape disposed about said rotor within said casing, means on said casing for the entrance and exit of said tape, means for the movement of said tape in and out of said casing, means for monitoring particles for radioactivity, and means for bringing said tape into operative association with said last-mentioned means.

15. In combination with a centrifugal separator for the separation of finely divided solid particles from a gaseous medium, of a rotor surrounding and spaced from said separator, means for flowing a liquid through said rotor for the collection of separated solid particles, means for monitoring particles for radioactivity, and means for bringing said liquid into operative association with said last-mentioned means.

References Cited in the file of this patent

UNITED STATES PATENTS

| | | |
|---|---|---|
| 2,289,474 | Anderson | July 14, 1942 |
| 2,576,616 | Livingston et al. | Nov. 27, 1951 |
| 2,709,500 | Carter | May 31, 1955 |
| 2,736,812 | Weinstein et al. | Feb. 28, 1956 |
| 2,738,426 | Hurst | Mar. 13, 1956 |
| 2,826,076 | Boretz et al. | Mar. 11, 1958 |

OTHER REFERENCES

Monitor Measures Air and Surface Contamination, by Watts et al., from Nucleonics, vol. 13, No. 1, January 1955, pages 51 and 52.